Sept. 11, 1923.                    1,467,313
J. R. GAMMETER
TIRE FLAP
Filed Aug. 9, 1922
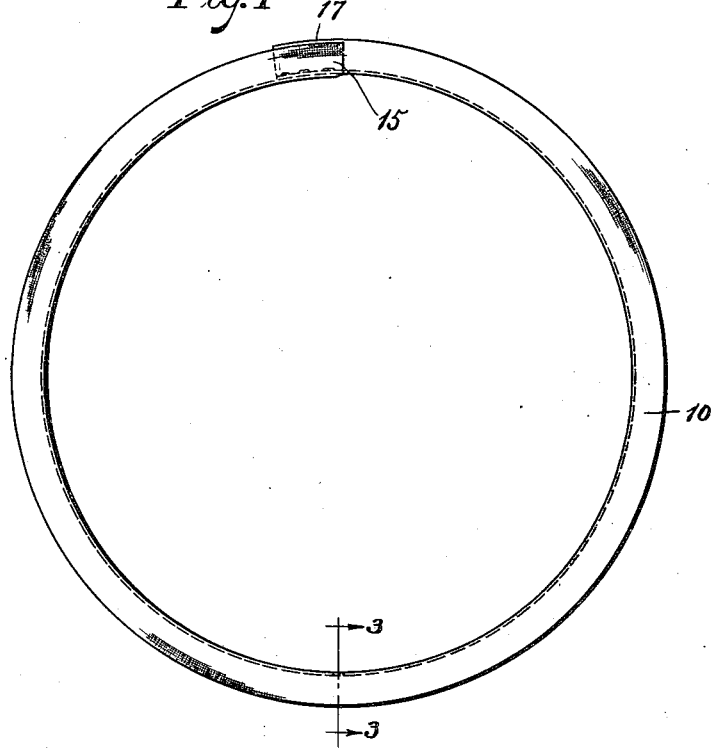
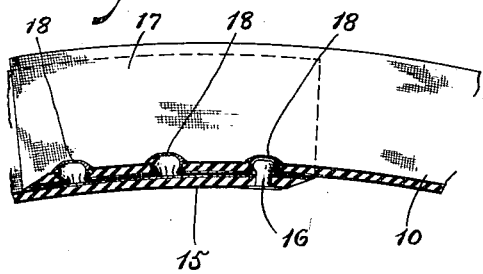
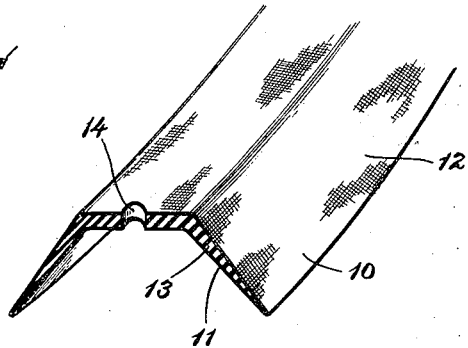
Inventor
John R. Gammeter.
By Robert M. Pierson
Atty.

Patented Sept. 11, 1923.

1,467,313

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE FLAP.

Application filed August 9, 1922. Serial No. 580,652.

*To all whom it may concern:*

Be it known that I, JOHN R. GAMMETER, a citizen of the United States, residing at Akron, in the county of Summit and State of Ohio, have invented a certain new and useful Tire Flap, of which the following is a specification.

This invention relates to flaps for insertion between the inner tube and the rim and casing beads of a pneumatic tire, and it has for its object to provide a simple and durable article of this nature which can be readily applied and removed, and firmly retained in its proper position.

Of the accompanying drawings, Fig. 1 is a side elevation showing a preferred form of my improved flap.

Fig. 2 is a longitudinal section at the joint.

Fig. 3 is a section on the line 3—3, partly in perspective.

In the drawings, 10 is a trough-shaped flap, here shown as made up of inner and outer surface plies 11, 12, of straight-laid, woven fabric, and an intervening layer 13 of suitable material, such as rubber and ground fiber composition, all parts being vulcanized together. I do not, however, limit myself to this particular construction.

A piece of the plied-up flap material having the desired length is cut off from a longer length, and the ends are overlapped as indicated in the upper portion of Fig. 1 and in Fig. 2 when the flap is in place in the tire. It is customary to overlap the ends at the tire valve, but in this case I overlap them at a different place, preferably at a point opposite to the valve hole 14, and thus avoid a double thickness at the valve where the diameter of the inner tube is already reduced by the presence of the retaining lug on the valve. Through one end 15 of the flap is inserted the male member 16 of an ordinary snap fastener, with its head projecting outwardly in the bottom of the trough at the middle line of the flap, and in the other end 17 are affixed a series of complementary female members 18 of snap fasteners, with their open ends exposed on the inner periphery and arranged in a longitudinal line, there being three of these members 18 shown in the present case, so that the flap can be adjusted to three different lengths to accommodate itself to the particular tire in which it is used.

The mode of operation will be obvious from the foregoing. Either before or after the tube is inserted in the casing, its valve stem is slipped through the hole 14, the ends 15 and 17 are brought together and overlapped at the opposite side, and the fastener member 16 is engaged with that one of the complementary fastener members 18 which will adjust said flap to the necessary length. In this way, a floating flap is provided which is firmly anchored against circumferential movement on the tube and which cannot change substantially in length after it has once been adjusted, so that the tendency of such flaps to work up out of place between the tire and tube in either direction from a middle position is to a large extent fully overcome.

I claim:

1. A flap for pneumatic tires having a hole for receiving the valve stem of the inner tube, and having overlapped ends at a different locality than said hole, and positive means for detachably securing said ends together in such manner as to prevent circumferential movement of said ends with relation to each other.

2. A floating flap for pneumatic tires having overlapped ends, and members of snap fasteners on the respective ends for detachably securing them together, said members being of such character and so mounted as to present no abrupt irregularities of surface to the inner tube when in fastened relation.

3. A floating flap for pneumatic tires having overlapped ends, a member of a snap fastener mounted on one end, and a longitudinal row of complementary members of snap fasteners mounted on the other end, said members being so positioned on said flap that the first said member may be engaged selectively with all of said complementary members and the flap held circularly extended without exposure of the detachably-engaging portion of any of said members on the side of the structure contacting the inner tube.

4. A floating flap for pneumatic tires formed with a hole for receiving the valve stem of the inner tube, and having overlapped ends substantially opposite said valve hole, and positive means for detachably securing said ends together in such manner as to prevent circumferential movement of said ends.

5. A floating flap for pneumatic tires formed with a hole for receiving the valve stem of the inner tube and having overlapped ends substantially opposite said valve hole, a male member of a snap fastener mounted on one of said ends and having its detachably-engaging portion on the outer side of the flap, and a longitudinal row of complementary members of snap fasteners mounted on the other end for detachably securing said ends together.

In witness whereof I have hereunto set my hand this 3d day of August, 1922.

JOHN R. GAMMETER.